United States Patent [19]

Yu

[11] Patent Number: 5,319,500
[45] Date of Patent: Jun. 7, 1994

[54] VIDEO REPRODUCING APPARATUS FOR MAINTAINING PICTURE QUALITY DURING HIGH SPEED SEARCH FUNCTIONS

[75] Inventor: Jae-cheon Yu, Seoul, Rep. of Korea

[73] Assignee: SamSung Electrnoics, Co., Ltd., Suwon, Rep. of Korea

[21] Appl. No.: 815,529

[22] Filed: Jan. 2, 1992

[30] Foreign Application Priority Data

Jan. 9, 1991 [KR] Rep. of Korea .......................... 91-225

[51] Int. Cl.⁵ ............................................. H04N 5/78
[52] U.S. Cl. .............................. 360/10.3; 360/36.20; 360/70; 358/338
[58] Field of Search ............... 360/36.1, 70, 71, 73.01, 360/73.04, 73.05, 73.07, 73.09, 73.14, 10.1, 10.3, 36.2; 358/335, 336, 337, 338

[56] References Cited

U.S. PATENT DOCUMENTS

| | | | |
|---|---|---|---|
| 4,365,279 | 12/1982 | Kinjo | 360/77.16 X |
| 4,539,606 | 9/1985 | Itoh | 360/10.3 X |
| 4,636,874 | 1/1987 | Hoogendoorn et al. | 360/10.3 X |
| 4,656,529 | 4/1987 | Sakamoto | 360/77.13 X |
| 4,656,537 | 4/1987 | Toba et al. | 360/10.3 X |
| 4,677,503 | 6/1987 | Nagasawa et al. | 360/10.3 X |
| 4,771,345 | 9/1988 | Watanabe | 360/10.3 X |
| 5,068,757 | 11/1991 | Hughes et al. | 360/77.13 |
| 5,130,858 | 7/1992 | Ebara et al. | 360/36.2 X |

*Primary Examiner*—Andrew L. Sniezek
*Attorney, Agent, or Firm*—Robert E. Bushnell

[57] ABSTRACT

A video reproducing apparatus which controls a revolution speed of the rotary drum to have a variable speed according to the tape transport speed during a special playback, and maintains the inclination angle of the head running locus to be the same as that during a standard playback. The apparatus comprises a capstan servo, a drum servo, a time base corrector, and a control circuit which controls the above elements, thereby displaying a clear picture without noise bars during the special playback modes.

20 Claims, 3 Drawing Sheets

5X PLAYBACK

2X PLAYBACK

STANDARD PLAYBACK

VIDEO REPRODUCING APPARATUS FOR MAINTAINING PICTURE QUALITY DURING HIGH SPEED SEARCH FUNCTIONS

BACKGROUND OF THE INVENTION

This invention relates to a video reproducing apparatus, and more particularly a video reproducing apparatus for improving picture quality of a playback screen during a special playback.

As shown in FIG. 1, a general video recording and reproducing apparatus such as a video cassette recorder (VCR) is an apparatus for recording the video signals on slant tracks 2 of a magnetic tape 1 and reproducing the recorded video signal therefrom. This apparatus records one field video signal for each slant track 2 by scanning slant track 2 of magnetic tape 1 with a rotary head having a constant rotating speed in the time of moving magnetic tape 1 at a standard speed (e.g. 33.35 mm/sec in the case of VHS standard of NTSC system) during a recording stage. This apparatus reproduces the video signal recorded on the slant tracks by controlling the transport speed of the magnetic tape and the rotation speed of the rotary head in a similar manner during a reproducing stage. Such a reproduction mode is called standard speed playback. In case of the standard speed playback, the clear picture screen is obtainable as shown in FIG. 2A. In a double speed playback mode, a tape transport speed is double the standard speed. Here, since the rotary head which is rotated with the same speed as that of the standard speed playback scans the magnetic tape while transversing two slant tracks, one noise bar appears in the playback screen as shown in FIG. 2B. In a five-time speed playback mode, the tape transport speed is five times as the standard speed. Accordingly, four noise bars appear in the playback screen as shown in FIG. 2C. Such noise bars occurring in the high speed playback mode correspond to the to a number of the slant tracks which are transversed by the rotary head. Thus, in variable speed playback or special playback mode except for a standard speed playback mode, the scanning locus of the rotary head is not the same as the slant tracks of the recording stage, with a result that the noise appears in the playback screen. Accordingly, the clear picture screen can not be provided as in the standard speed playback.

SUMMARY OF THE INVENTION

To solve the above problem of the conventional technology, this invention provides a video recording and reproducing apparatus capable of reproducing a clear picture screen free from noise in a special playback.

To accomplish the above object of this invention, there is provided a video reproducing apparatus having a predetermined track inclination angle during a standard speed tape transport of a magnetic tape, comprising:

a capstan servo circuit for controlling a capstan motor speed to control the magnetic tape transport speed;

a drum servo circuit for controlling a drum motor speed to control revolution speeds of rotary heads which are rotated so as to maintain the predetermined track inclination angle with respect to the magnetic tape transport direction;

a time base correction circuit for correcting the video signal reproduced through said rotary heads into a format of the video signal during a standard playback; and a control circuit which receives respective frequency signals corresponding to speeds of said capstan motor and said drum motor and supplies speed control signals to said capstan motor and drum motor servo circuits so as to maintain said predetermined running track inclination angle at all playback modes, and which receives a horizontal synchronization signal of said reproduced video signal and supplies a time base control signal to said time base correction circuits.

DETAILED DESCRIPTION OF THE PREFERRED EMBODIMENT

An embodiment of a video reproducing apparatus according to this invention will be described in detail with reference to the accompanying drawings.

Figure 1:
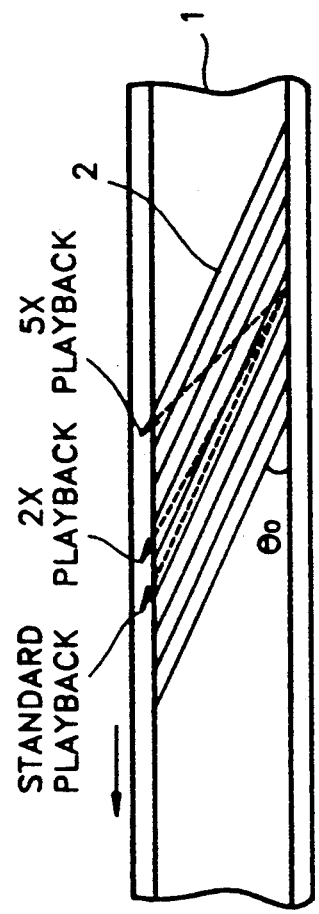
FIG. 1 is a view for explaining a head running locus according to the various playback modes in a general rotary head type video recording and reproducing apparatus.
Figure 2C:
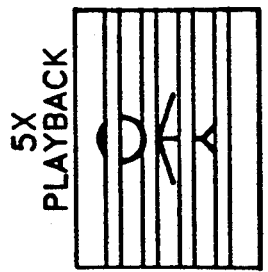
FIGS. 2A, 2B and 2C are views which represent playback picture screens in a standard speed playback, a double speed playback and a five-time speed playback of a general rotary head type video reproducing apparatus, respectively.
Figure 2B:
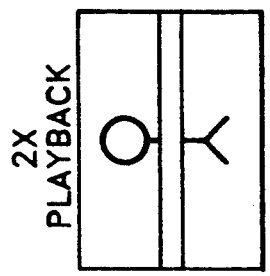
Figure 2A:
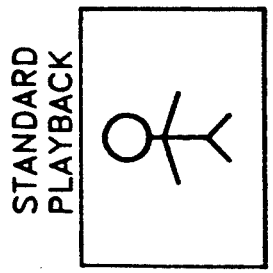
Figure 3:
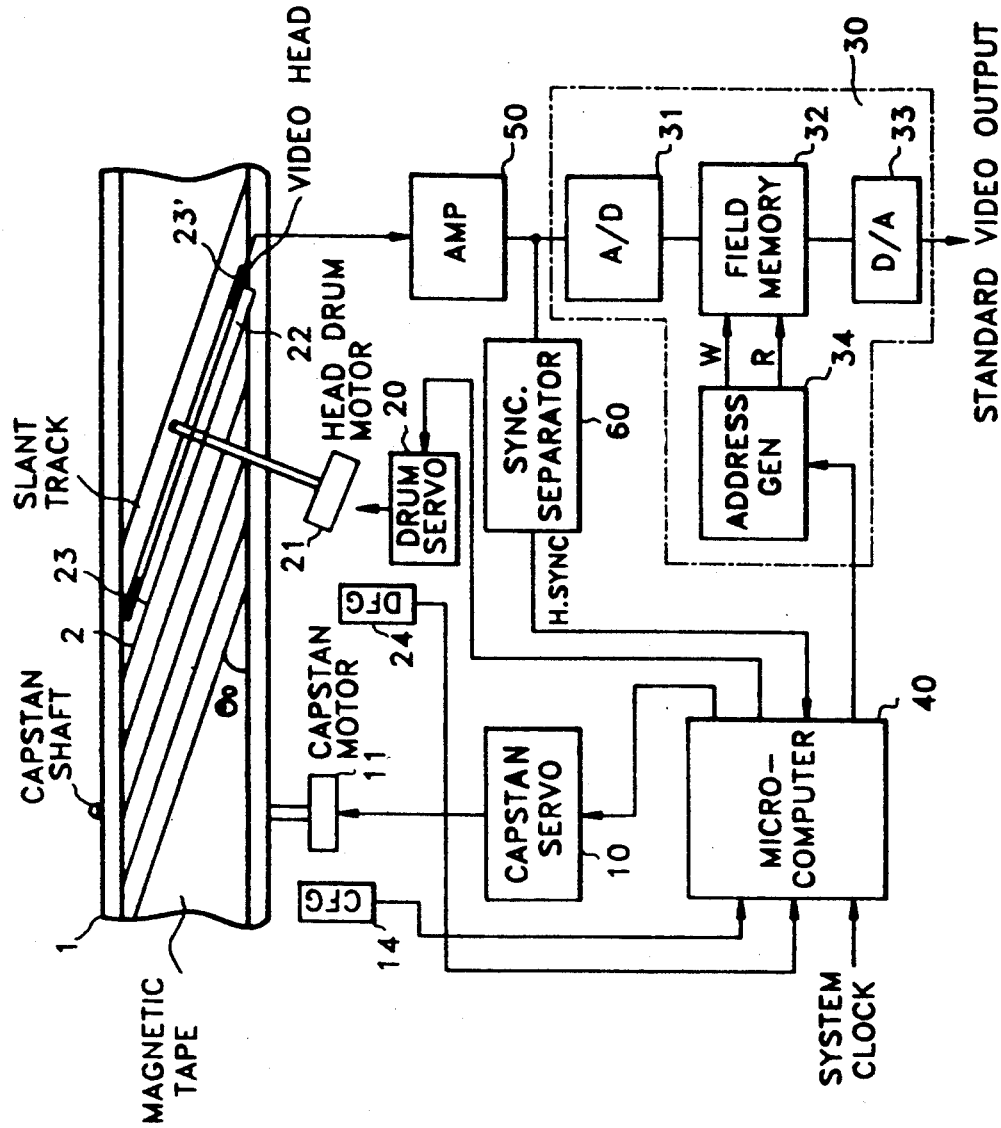
FIG. 3 is a block diagram showing a video reproducing apparatus according to this invention.

Referring to FIG. 3, the video reproducing apparatus according to this invention generally includes a capstan servo 10, a drum servo 20, a time base correction circuit 30 and a control circuit 40. Capstan servo 10 controls a revolution speed of capstan motor 11, thereby controlling the transport speed of magnetic tape 1 contacted to a capstan shaft (not shown).

Drum servo 20 controls a revolution speed of drum motor 21, thereby controlling the revolution speed of heads 23 and 23' mounted on rotary drum 22. Rotary heads 23 and 23' are inclined by a predetermined angle $\theta$ with respect to the tape transport direction so as to scan track 2 of magnetic tape 1. When the tape is stopped, the track inclination angle $\theta$ has a standard value of five degrees fifty six minutes and seven point four seconds (5°56'7.4"), for NTSC system. In a standard speed playback (e.g. in case of NTSC system the tape transport speed is 33.35 mm/sec and the relative speed of the rotary drum with respect to the tape is 5.8 m/sec), the running locus of head 23 has a running angle of five degrees fifty eight minutes and nine point nine seconds (5°58'9.9") with respect to the tape transport direction.

Figure 4:
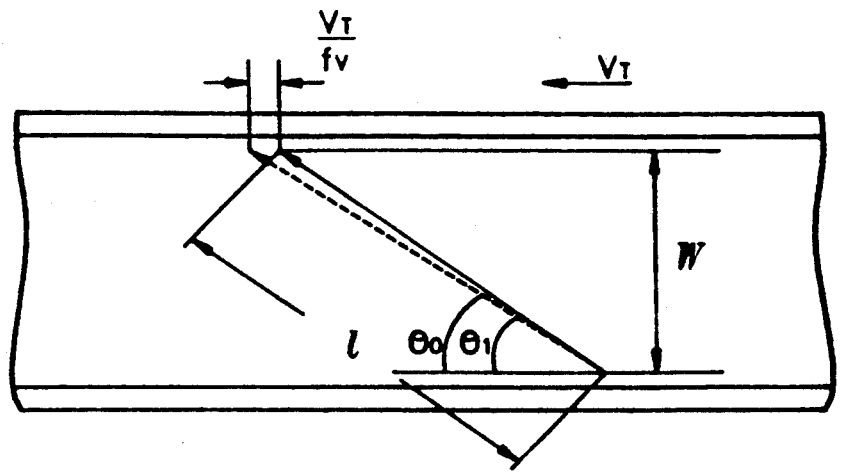
FIG. 4 is a view for explaining an inclined angle of the head running locus when the magnetic tape is stopped or moved in the video reproducing apparatus.
Figure 5:
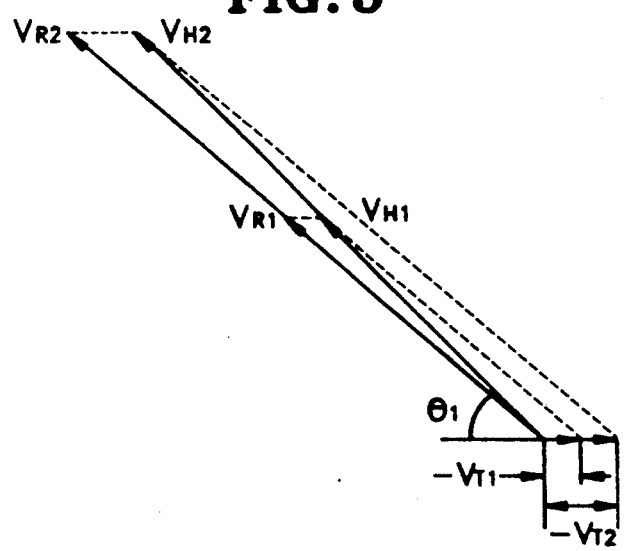
FIG. 5 is a view for explaining a basic concept of a video reproducing apparatus according to this invention.

Referring to FIG. 4, running angle $\theta_1$ can be calculated by the following equation (1):

$$\theta_1 = \tan^{-1} \frac{W}{\frac{\pi D}{2} \cos\theta_0 - \frac{V_T}{f_v}} \quad (1)$$

where $\theta_0$ is an inclination angle of the head locus when the tape stops, W is an effective width of the tape, D is a diameter of the rotary drum, $V_T$ is a tape transport speed and $f_v$ is a vertical synchronization frequency. Here, vertical synchronization frequency $f_v$ is represented with respect to a relative speed of the head drum by a following equation (2):

$$f_v = \frac{V_H}{l} \quad (2)$$

where $V_H$ is a relative speed with respect to the tape transport speed of the rotary drum, and l is a length of the head running locus in a tape run.

Therefore, it can be seen that inclination angle $\theta_1$ of the head running locus in the tape run is a function of the tape transport $\vec{V_T}$ and the rotary drum relative speed $\vec{V_H}$ from the above equations (1) and (2). Also, since rotary drum relative speed $\vec{V_H}$ is represented as $\vec{V_R}-\vec{V_T}$, in which $\vec{V_R}$ is a rotary drum revolution speed, it can be seen that inclination angle $\theta_1$ of the head running locus is a function of rotary drum revolution speed $\vec{V_R}$ and tape transport speed $\vec{V_T}$.

Therefore, to remove the noise bars generated due to the result that the head transverse between the slant tracks during a special playback having a different tape transport speed other than that of the standard speed playback, the revolution speed of the rotary drum is controlled to have a variable speed in response to the tape transport speed, in the apparatus according to this invention. That is, the tape transport speed and the rotary drum revolution speed are controlled in order that the inclination angle of the head running locus during the special playback equals that during the standard speed playback. As described above, if the revolution speed of the rotary drum is controlled to have a variable speed, the reproduced video signal format is not VHS standard. As a result, the normal picture is not displayed on the screen. Accordingly, the time base correction is required to match the reproduced video signal to the VHS standard. For example, in the NTSC system, 1/60 seconds for one vertical synchronization period is required. However, during a variable speed control of the rotary drum, the above 1/60 seconds does not kept, thereby creating difficulty in displaying the normal picture on the screen. Therefore, referring to FIG. 3, the video reproducing apparatus according to this invention includes a time base correction circuit 30 in order to match the reproduced video signal to the VHS standard. The video signals reproduced through video heads 23 and 23' is amplified in amplifier 30 and the amplified signal is supplied to the time base correction circuit 30. Also, the amplified signal is supplied to sync separator 60. Sync separator 60 outputs a horizontal synchronization signal. Time base correction circuit 30 comprises an A/D converter 31 for receiving and converting the reproduced video signal into a digital video signal, a field memory 32 for storing the output data of A/D converter 31, a D/A converter 33 for converting the read-out data from the above memory 32 into an analog video signal, and an address generator 34 for generating write and read address signals for field memory 32. In address generator 34, the write address signal period is different from the read address signal period. That is, the write address signal period has a period capable of writing the reproduced video data unmatched to the standard in the field memory. On the other hand, the read address signal period has a period capable of reading the video data matched to the standard from the field memory.

In FIG. 3, reference numeral 40 designates a microcomputer, which receives frequency signals through frequency generators 14 and 24 positioned in the vicinity of capstan motor 11 and drum motor 21, respectively. Also, microcomputer 40 receives a horizontal synchronization signal separated in sync separator 60. Microcomputer 40 supplies speed control signals to capstan servo 10 and drum servo 20, respectively, and supplies an address signal period control signal to address generator 34 of time base correction circuit 30. Microcomputer 40 receives the capstan frequency signal and the drum frequency signal, and calculates the tape transport speed $V_T$ and the rotary drum revolution speed $V_R$, respectively, in accordance with the following equations (3) and (4)

$$V_T = \frac{\pi d/Nc}{Wf_1} \quad (3)$$

where d is a diameter for the capstan shaft, $Wf_1$ is a pulse width of the capstan frequency signal and Nc is a number of pulses for each revolution of the capstan motor; and $$V_R = \frac{\pi D/Nd}{Wf_2} \quad (4)$$

where D is a diameter for the rotary drum, $WF_2$ is a pulse width of the drum frequency signal and Nd is a number of pulses for each revolution of the drum motor.

Therefore, microcomputer 40 calculates drum revolution speed $V_R$ according to the above equation (4) and generates a speed control signal in order that head running locus inclination angle $\theta_1$ which is calculated in accordance with tape transport speed $V_r$ using the above equation (1) during a special playback is maintained as inclination angle $\theta$ during the standard speed playback.

Figure 6A:
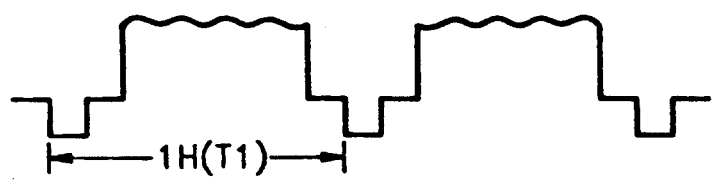
FIG. 6A is a waveform diagram which shows a reproduced video signal during a standard playback.
Figure 6B:
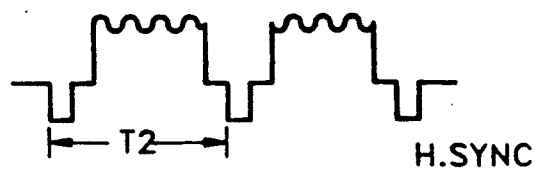
FIG. 6B is a waveform diagram which shows a reproduced video signal during a special playback.

When the revolution speed of the rotary drum is off the standard value, the reproduced video signal shown in FIG. 6B is different from the video signal as shown in FIG. 6A during the standard speed playback.

Accordingly, microcomputer 40 receives the horizontal synchronization signal separated from the reproduced video signal and calculates reproduction horizontal period $T_2$. That is, microcomputer 40 resets the set internal counter at the falling edge of the horizontal synchronization signal and increases the value of the internal counter by 1 whenever the system clock is input, thereby calculating reproduction horizontal period $T_2$. Also, microcomputer 40 generates an address signal period control signal for address generator 34. Address generator 34 generates a read address clock and a write address clock for field memory 32 according to the following proportional equation (5):

$$T_1:T_2 = CLK_1:CLK_2 \quad (5)$$

where $T_1$ is reproduction horizontal period during the standard speed playback, $CLK_1$ is a read address clock and $CLK_2$ is a write address clock.

Accordingly, address generator 34 generates a write address clock $CLK_2$ by multiplying a ratio $T_2/T_1$ by reference clock $CLK_1$ being the read address clock in accordance with the address signal period control signal. Therefore, time base correction circuit 40 matches the non-standard video signal to the time base of the standard video signal by maintaining the write and read address periods for the memory to be different to each other, thereby displaying the normal picture on the display unit such as a cathode ray tube.

As described above, the video reproducing apparatus according to this invention controls the revolution speed of the head drum according to the tape transport speed during a special playback, so as to maintain the inclination angle of the head running locus to be the same as that during the standard speed playback, thereby enabling to display a clear picture without any noise bars.

What is claimed is:

1. A video reproducing apparatus having a predetermined running track inclination angle during a standard speed tape transport of magnetic tape, comprising:
   capstan servo means for responding to speed control signals by controlling capstan motor speed to thereby control said magnetic tape transport speed;
   drum servo means for responding to said speed control signals by controlling drum motor speed to thereby control revolution speeds of rotary heads and maintain said predetermined running track inclination angle with respect to a magnetic tape transport direction;
   time base correction means for converting a reproduced video signal reproduced through said rotary heads into a time base corrected video signal; and
   control means for receiving frequency signals corresponding to speed of said capstan motor and said drum motor, and for generating said speed control signals to maintain said predetermined running track inclination angle during a standard playback mode in which said magnetic tape transport speed is the same as a recording mode and during a special playback mode in which said magnetic tape transport speed is greater than said recording mode.

2. A video reproducing apparatus as claimed in claim 1, wherein said control means maintains said predetermined running track inclination angle ($\theta_1$) by varying said drum motor speed and said tape transport speed in response to an equation:

$$\theta_1 = \tan^{-1} \frac{W}{\frac{\pi D}{2} \cos \theta_0 - \frac{V_T}{f_v}}$$

where $\theta_0$ is an inclination angle of a rotary head locus when a magnetic tape is stopped, W is an effective width of said magnetic tape, D is a diameter of a rotary drum, $V_T$ is said tape transport speed, and $f_v$ is a vertical synchronization frequency.

3. A video reproducing apparatus as claimed in claim 2, wherein said time base corrected video signal has a standard time base.

4. A video reproducing apparatus as claimed in claim 1, wherein said control means generates time base control signals received by said time base correction means in response to said reproduced video signal.

5. A video reproducing apparatus as claimed in claim 1, wherein said time base correction means comprises:
   address generating means for generating read addresses and write addresses;
   analog to digital converter for converting said reproduced video signal into a digital video signal;
   field memory means for storing said digital video signal in response to said write addresses and for generating a digital time base corrected video signal in response to said read addresses; and
   digital to analog converter means for converting said digital time base corrected video signal into said time base corrected video signal.

6. A video reproducing apparatus as claimed in claim 5, wherein a ratio of periods of said read addresses to said write addresses is equal to a ratio of a standard horizontal period to a horizontal period of said reproduced video signal generated by said rotary heads.

7. A video reproducing apparatus as claimed in claim 6, wherein said time base corrected video signal has a VHS standard time base.

8. A video reproducing apparatus as claimed in claim 5, wherein said write addresses are generated in response to horizontal synchronization signals of said reproduced video signal generated by said rotary heads.

9. A video reproducing apparatus as claimed in claim 1, wherein said time base corrected video signal has a VHS standard time base.

10. A video reproducing apparatus as claimed in claim 1, wherein said time base corrected video signal has a standard time base.

11. A method for controlling a video tape recorder comprising:
    selecting a video tape speed;
    controlling a speed of a video record head in response to the selected video tape speed to maintain a fixed running track inclination angle regardless of said video tape speed; and
    correcting a time base of a video signal generated by said video record head; wherein said speed of the video record head is controlled by maintaining said fixed running back inclination angle ($\theta_0$) by varying drum motor speed and tape transport speed in response to an equation:

$$\theta_1 = \tan^{-1} \frac{W}{\frac{\pi D}{2} \cos \theta_0 - \frac{V_T}{f_v}}$$

where $\theta_0$ is an inclination angle of locus of a rotary head when a magnetic tape is stopped, W is an effective width of said magnetic tape, D is a diameter of a rotary drum, $V_T$ is said tape transport speed, and $f_v$ is a vertical synchronization frequency.

12. A method for controlling a video tape recorder as claimed in claim 11, wherein said time base is corrected to have a vertical synchronization of one sixtieth of a second.

13. A video tape reproducing apparatus for reproducing video signals from helically scanned tracks of video tape, said apparatus comprising:
    capstan servo means for controlling a capstan motor speed to thereby control tape transport speed in response to speed control signals drum servo means for controlling a head drum speed in response to said speed control signals;

reproducing heads disposed on a head drum for regenerating a reproduced video signal from said video tape;

control means for generating said speed control signals to maintain a predetermined running track inclination angle during a standard playback mode in which said tape transport speed is the same as a recording mode, and for generating said speed control signals to maintain said predetermined running track inclination angle during a non-standard playback mode in which said tape transport speed is greater than said recording mode; and time base correction means for expanding a time base of said reproduced video signals reproduced during said non-standard playback mode to conform with a time base of reproduced video signals reproduced during said standard playback mode.

14. A video tape reproducing apparatus as claimed in claim 13, wherein said time base correction means comprises:

address generating means for generating read addresses in response to horizontal synchronizing signals in said reproduced video signal and write addresses in response horizontal synchronizing signals for standard time base;

analog to digital converter for converting said reproduced video signal into a digital video signal; and field memory means for storing said digital video signal in response to said write addresses, and for generating a time base corrected video signal in response to said read addresses.

15. A video tape reproducing apparatus as claimed in claim 14, further comprised of said time base correction means for expanding a time base of said reproduced video signal reproduced during said non-standard playback mode to conform to a time base of reproduced video signals reproduced during said standard playback mode.

16. A method for controlling head drum speed during standard reproduction mode and non-standard reproduction mode of video signals recorded on helically scanned tracks of video tape, said method comprising:

matching said head drum speed to a standard tape transport speed so that record heads of a head drum track each of said helically scanned tracks during said standard reproduction mode; and matching said head drum speed to a non-standard tape transport speed so that said record heads of said head drum track entire ones of said helically scanned tracks during said non-standard reproduction mode, said non-standard tape transport speed being greater than said standard tape transport speed; and expanding a time base of video signals reproduced during said non-standard reproduction mode to correspond to a time base of video signals reproduced during said standard reproduction mode.

17. A video tape reproducing apparatus for reproducing video signals from helically scanned tracks of video tape, said apparatus comprising:

capstan servo means for controlling a capstan motor speed to thereby control tape transport speed in response to speed control signals;

drum servo means for controlling a head drum speed in response to said speed control signals;

reproducing heads disposed on a head drum for regenerating a reproduced video signal from said video tape; and control means for generating said speed control signals so that said record heads maintain a predetermined running track inclination angle during a standard playback mode, said reproduced video signal having a standard time base during said standard playback mode, and for generating said speed control signals to maintain said predetermined running track inclination angle during a high speed search playback mode, said tape transport speed being greater during aid high speed search playback mode than during said standard playback mode; and time base correction means for expanding a time base of said reproduced video signals reproduced during said high speed search playback mode to conform to a time base of said standard playback mode.

18. A video tape reproducing apparatus as claimed in claim 17, wherein said time base correction means comprises:

address generating means for generating read addresses in response to horizontal synchronizing signals in said reproduced video signal and write addresses in response horizontal synchronizing signals for a standard time base;

analog to digital converter for converting said reproduced video signal into a digital video signal; and field memory means for storing said digital video signal in response to said write addresses, and for generating a time base corrected video signal in response to said read addresses.

19. A video reproducing apparatus having a predetermined running track inclination angle during standard speed tape transport and non-standard speed tape transport, comprising:

capstan servo means for controlling capstan motor speed in response to speed control signals;

drum servo means for controlling drum speed in response to said speed control signals;

time base correction means for converting a reproduced video signal reproduced by rotary heads disposed on said drum into a time base corrected video signal in response to an address signal period control signal; and control means for generating said speed control signals to maintain said predetermined running track inclination angle during a standard playback mode, and for generating said speed control signals to maintain said predetermined running track inclination angleduring a non-standard playback mode and said address period control signal to correct a time base of said reproduced video signal.

20. A video reproducing apparatus as claimed in claim 19, wherein said non-standard playback mode is a high speed search playback mode.

* * * * *

UNITED STATES PATENT AND TRADEMARK OFFICE
CERTIFICATE OF CORRECTION

PATENT NO. : 5,319,500
DATED : June 7, 1994
INVENTOR(S) : YU

It is certified that error appears in the above-indentified patent and that said Letters Patent is hereby corrected as shown below:

Title Page, in the ABSTRACT:
Line 1, delete "which".

Column 1,    Line 29, before "as", insert --,--.

Line 40, change "a" to --the--.

Line 54, change "in a" to --during--.

Column 6,    Line 44, change "back" to --track--.

Column 8,    Line 18, change "aid" to --said--.

Signed and Sealed this

Eleventh Day of April, 1995

Attest:

BRUCE LEHMAN

*Attesting Officer*        *Commissioner of Patents and Trademarks*